United States Patent Office 3,146,834
Patented Sept. 1, 1964

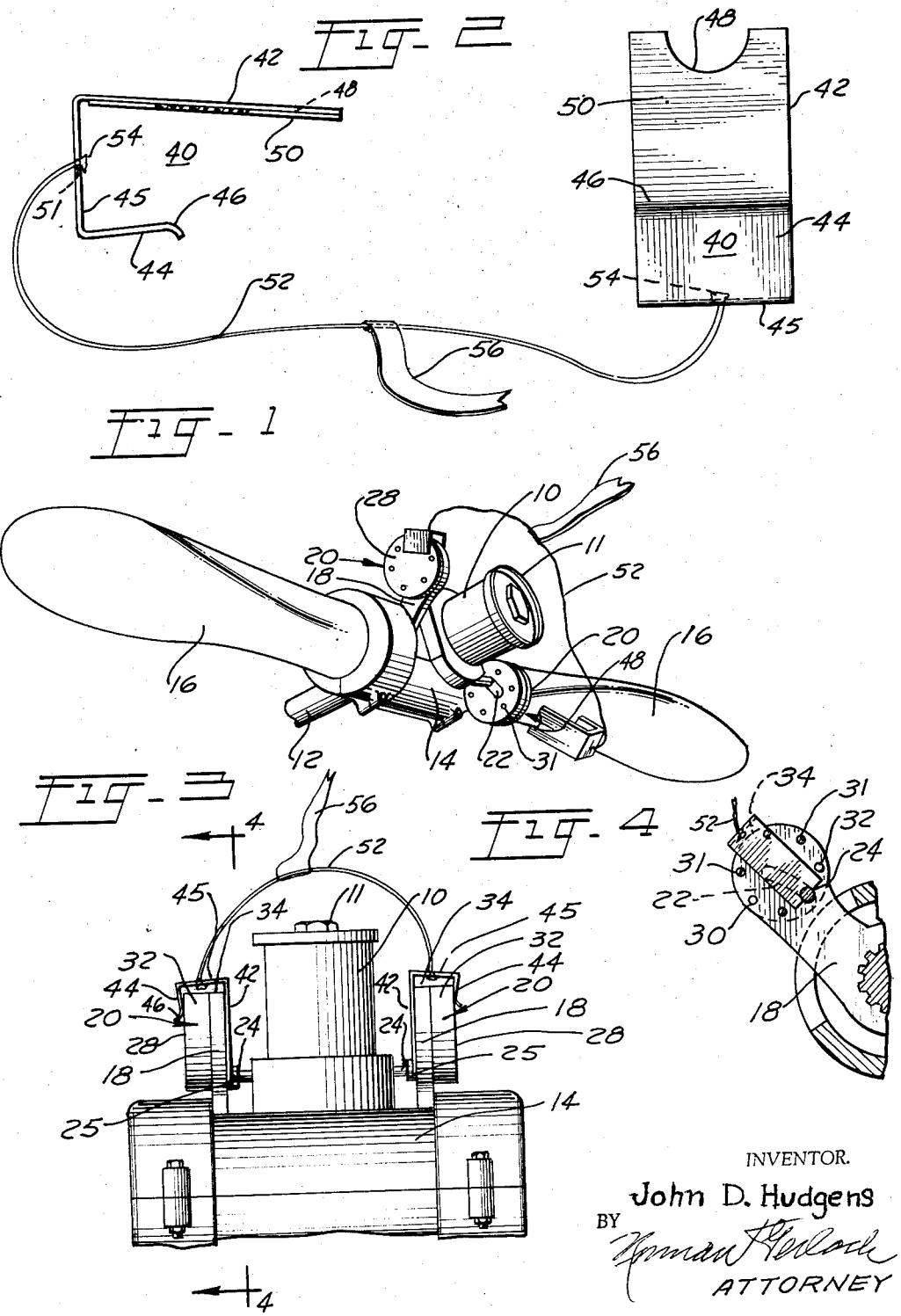

3,146,834
CLOSURE ASSEMBLY FOR THE COUNTERWEIGHT CASINGS OF A VARIABLE PITCH AIRCRAFT PROPELLER
John D. Hudgens, El Paso, Tex., assignor to Arthur Thompson, Jr., Hereford, Ariz.
Filed June 25, 1963, Ser. No. 290,354
6 Claims. (Cl. 170—160.23)

The present invention relates to a closure assembly for closing and sealing the cam slots which are associated with the counterweight casings of a variable pitch aircraft propeller.

In a particular type of variable pitch aircraft propeller, the pitch angle of each individual propeller blade is controlled by means of a lever arm which projects outwardly through an opening in the propeller blade mounting spider or barrel and has the proximate end thereof splined to the inner end of the associated propeller blade. The distal end region of the lever arm is provided with a cam slot, and a cup-shaped grease retainer of cylindrical design is bolted to the distal end region of the lever arm, and in combination with such region, establishes a grease-packed counterweight casing in the vicinity of the cam slot. A guide pin extends through the cam slot and into the counterweight casing and is attached to a cylinder which is longitudinally slidable on a fixedly mounted piston on the outer or forward end of the rotatable propeller shaft of the aircraft. By means of certain precision mechanism which bear no direct relation to the present invention and, consequently, have not been described herein, the relative position of the cylinder and piston and, consequently, the position of the guide pin within the cam slot of the counterweight casing, controls the pitch angle of the propeller blade. The counterweight in any position thereof is acted upon by centrifugal force and the effect thereof is to counteract the normal tendency of its respective propeller blade to return to a position of zero pitch.

Heretofore, in order to prevent the entrance of foreign material into the counterweight casings of a variable pitch aircraft propeller of the aforementioned type when the aircraft is grounded or otherwise is not in use, it has been the practice to enclose the counterweight casings in small draw-string type sacks or, alternatively, to stuff the guide pin-receiving cam slots of the counterweight casings with paper, cloth or other available loose sealing material. These expedients have the obvious disadvantage of requiring considerable care and attention in the application and removal thereof, while in the case of stuffing the cam slots, there is the danger that some of the stuffing material may enter the counterweight casing and remain there with the resultant possibility or likelihood of contaminating the grease or other lubricant in the casings. Still further, whether the counterweight casings be protected by way of encompassing draw-string type sacks or stuffed paper or cloth in the cam slots, there always is the danger that a pilot, mechanic or ground crewman may inadvertently neglect to remove the sacks or sealing material before operating the aircraft, in which case the propeller shaft operating mechanism may be rendered inoperative or become damaged due to clogging.

The present invention is designed to overcome the above-noted limitations that are attendant upon such relatively crude methods of, or arrangements for, protecting the operating mechanism for the blades of a variable pitch aircraft propeller, and toward this end, the invention contemplates the provision of a novel closure assembly for the cam slots that are in associated relation with the counterweight casings of a variable pitch aircraft propeller, the assembly consisting of two or more closure units, one for each propeller blade of the propeller, and the units being operatively connected together by a combined tie and draw cord by means of which the units are held together as a unitary assembly to the end that there is no danger of one of the units becoming misplaced or lost, the cord also serving as a draw cord which will enable the closure units to be simultaneously pulled from the counterweight casings of the propeller by the pilot or ground crew operator immediately prior to the operation of the aircraft, and the cord further serving as a hanger instrumentality by means of which the entire assembly may, if desired, be suspended when not in use from a suitable hook-type support for storage until the next occasion for use thereof arises. Each closure unit is in the form of a unitary spring clip which is of generally U-shape configuration and has a closure leg and a reaction leg, the two legs being connected together by a bight portion. The closure leg of each closure unit is in the form of a flat plate, the over-all dimensions of which are greater than the over-all dimensions of the particular counterweight casing cam slot to be closed. Each closure unit is applied to its associated or respective counterweight casing by the simple expedient of causing the legs thereof to straddle the casing so that the closure leg lies flush with the slotted portion of the casing, i.e., the distal end region of the lever arm, and completely covers the adjacent cam slot. The reaction leg of each closure unit bears against the opposite side of the casing, i.e., the cup-shaped grease retainer, and serves to tension the clip so that the closure leg is drawn firmly into engagement with the slotted side of the casing. Each clip is applied by sliding it into position. The combined tie and draw cord has its ends connected to the bight portions of the two closure units and is of sufficient length as to span the distance between the closure units and allow for an appreciable looseness so that by grasping the cord medially of its ends and pulling on it, the closure units may be pulled forcibly from their operative protective positions on their respective counterweight casings. To protect the slotted sides of the counterweight casings from being scratched or otherwise marred during closure unit installation and removal operations, cork or other resilient sealing strips are applied to the inside faces of the closure legs and these strips serve the additional function of sealing the closure legs to the rims of the cam slots in the counterweight casings. The invention further contemplates that the usual guide pins which project outwardly of the cam slots in the counterweight casings shall not obstruct proper application of the closure units to the casings, nor by their presence, prevent full and effective sealing and closure of the cam slots. Accordingly, the distal ends of the closure legs of the closure units are recessed in conformity with the configuration of the washers that are associated with the guide pins of the propeller so that when the units are applied, the full exposed contours of the cam slots are covered by the closure legs. Additionally, the guide pin washers serve as a centering means, first, to facilitate application of the closure units of the assembly, and secondly, to hold the units centered on the counterweight casings in their operative positions. Finally, a colored streamer is attached to the combined tie and draw cord as an indication or reminder to the pilot or maintenance personnel that removal of the assembly is in order before the aircraft with which it is used is operated.

The provision of a closure assembly of the character briefly outlined above being the principal object of the invention, it is a further object to provide such an assembly which, when operatively installed upon the counterweight casings of a given variable pitch aircraft propeller, will maintain the component parts thereof in such off-center position with respect to the axis of the propeller shaft that should the aircraft be inadvertently operated without first removing the closure units, the entire closure assembly will be forced by the action of centrifugal force from its operative position so that the aircraft may proceed on its flight without obstruction by the closure assembly.

In the accompanying single sheet of drawings forming a part of this specification, one illustrative embodiment of the invention has been shown.

In this drawing:

FIG. 1 is a front perspective view showing a two-blade variable pitch aircraft propeller having operatively applied thereto the improved closure assembly of the present invention;

FIG. 2 is an elevational view of the closure assembly showing one closure unit in plan elevation and the other closure unit in side elevation;

FIG. 3 is a side elevational view of a counterweight casing showing one of the closure units of the closure assembly operatively applied thereto; and FIG. 4 is a rear elevational view of the structure shown in FIG. 3.

Referring now to the drawing in detail, and in particular to FIG. 1, the salient elements of a conventional or standard variable pitch aircraft propeller, and only those which bear a direct relationship to the present invention, have been illustrated in this figure. These elements include an axially-shiftable control cylinder 10 which is slidably disposed on a fixed piston 11 at the forward end of the propeller shaft 12, a transversely extending propeller blade barrel 14, two aligned radially-extending propeller blades 16, a pair of lever arms 18 for effecting changes in the pitch of the blades 16, and two cylindrical cup-shaped grease retainers or counterweight casings 20, one for each lever arm.

The inner or proximate ends of the aligned propeller blades 16 are individually rotatable in the barrel 14 and the lever arms 18 extend radially outwardly from the inner ends of the blades to which they are splined as indicated at 21 in FIG. 4. In the maximum pitch positions of the blades, these lever arms are inclined rearwardly in the trailing direction of rotation of the propeller shaft 12 as shown in FIG. 1. In the minimum pitch positions of the blades, the lever arms extend forwardly and may project at an angle of approximately 90° to the plane of rotation of the blades. In some variable pitch propellers of the type under consideration, the lever arms are capable of being moved to positions of inclination past the zero angle of propeller blade pitch so that they are inclined in the leading direction of rotation, thus causing the blades to give a braking action to the aircraft in flight. The lever arms 14 project outwardly in close proximity to and elongside of the control cylinder 10 and extend through a common opening 22 which is formed in one side of the barrel 14.

Each lever arm 18 has mounted on the distal end thereof one of the grease retainers or counterweight casings 20, the casing being of cylindrical cup-shape design, and in combination with the associated lever arm 18, providing an internal chamber which is filled or packed with grease or other lubricant. The distal end region of each lever arm 18, in effect, constitutes an outside or rear wall for the otherwise open-ended casing.

Operating shafts or guide pins 24 carrying washers 25 have certain ends thereof secured to the cylinder 10 and project into the counterweight casings 20 through arcuate cam slots 26 which are formed in the distal end regions of the lever arms 18. The circular front walls 28 of the casings are provided with series of peripherally disposed holes, two of the holes of each series receiving therein locatating pins 30 and the remaining holes receiving therethrough clamping screws 31 by means of which the associated casing is secured to the associated lever arm 18. The cylindrical walls 32 of the counterweight casings 20 are in register with the curved outer edges 34 of the lever arms 18.

The axial position of the cylinder 10 on the piston 11 controls the pitch of the propeller blades 16. As the cylinder 10 shifts forwardly or rearwardly on the piston under the control of certain hydraulic instrumentalities which have no bearing upon the present invention and, consequently, have not been illustrated herein, the guide pins 24 move bodily with the cylinder, and in so moving, they ride in the cam slots 26, thus causing the lever arms 18 to swing in one direction or the other. Inasmuch as the inner ends of the lever arms are suitably splined to their respective propeller blades 16, such swinging movement of the lever arms effects a change in the pitch of the propeller blades. The counterweight casings 20 and the adjacent portions of the lever arms to which they are attached, being radially offset from the axis of rotation of the propeller shaft, are acted upon by centrifugal force and serve to counterbalance the normal tendency of the propeller blades to assume a position of minimum or zero pitch.

It will be observed that in the normal maximum pitch position of the propeller blades 16, the lever arms 18 assume positions of inclination and the counterweight casings 20 are so disposed that the guide pins 24 project through the cam slots 26 adjacent to the inner ends thereof, the remaining portions of the slots being exposed for possible entry of dirt or other foreign material, including moisture, into the interior of the casings 20. The illustrated positions of the guide pins 24 with respect to the cam slots 26 are the normal positions thereof when the aircraft is not in use and, therefore, in order to seal the slots against such entry of foreign material during long periods of aircraft idleness, it has been customary to enclose the distal ends of the lever arms 18, including the counterweight casings 20, in draw-string type sacks or to stuff the cam slots with waste cloth or paper material as heretofore pointed out.

The present invention affords a more expeditious means for sealing the cam slots 26 against entry of foreign material into the grease-retaining counterweight casings 20 and, accordingly, there is provided the assembly of parts which is shown in FIG. 2, this assembly including two identical closure units 40. Each unit is in the form of a generally U-shaped spring clip which is formed of flat spring steel stock and has a relatively long flat closure leg 42, a relatively short reaction leg 44, and a connecting bight portion 45. The reaction leg 44 of each unit is biased inwardly at a small angle to the plane of the closure leg 42 and the distal edge region of the reaction leg is curved as at 46 to facilitate application of the unit to one of the counterweight casings 20 as will be described presently. The length of the bight portion 45 of each closure unit 40 is slightly greater than the over-all width of the associated counterweight casing 20 and the lever arm 18 to which the casing is attached. The length of the closure leg 42 of each unit is substantially equal to the length of the cam slot 26 and the distal or outer edge of the leg 42 is formed with a cut-out notch 48 conforming to the cylindrical curvature of the associated guide pin washer 25. A cork or other resilient liner strip 50 is applied to the inside face of each closure leg 42, an epoxy or other adhesive being employed for bonding purposes. The strips 50 serve the dual function of protecting the inside faces of the lower arms 18 from being marred or otherwise damaged or defaced, and also of effecting seals with the rims of the cam slot 26 which they cover when the closure units are in proper position on the counterweight casings.

The bight portions 44 of the two closure units 40 are formed with small holes 51 therethrough, these holes receiving therein the end regions of an elongated combined tie and draw cord 52 by means of which the two units are connected together. The cord is preferably formed of nylon or similar plastic material. In order that the extreme end regions of the cord shall consume but little space within the confines of the U-shaped closure units 40, these regions of the cord are heated beyond the melting point of the nylon material in order to form small knobs 54 which are slightly larger in size than the holes 50 and serve to prevent the ends of the cord from pulling away from the units 40. A colored streamer such as has been shown at 56 may be applied to a medial region of the combined tie and draw cord 52 for attention-attracting purposes if desired to minimize the danger of inadvertent operation of the aircraft with the closure assembly in its installed or operative position.

The closure assembly is applied to the counterweight casings 20 by the simple expedient of pushing or sliding them into position thereon so that the closure legs 42 and the reaction legs 44 straddle the casings 20 with the reaction legs 44 fitting flush against the circular walls 28, the closure legs 42 bearing against the outside faces of the lever arms 18 and the bight portions 44 overlying the cylindrical walls 32 of the casings 20. The flared or curved distal edges 46 of the reaction legs facilitate initial application of the units 40 to the counterweight casings 20. When the units 40 are in their home or operative positions on the casings, the cut-out notches 48 embrace the guide washers 25 so that the closure legs thus substantially completely cover the cam slots 26 while the cork or other liner strips provide an effective seal with the rims of said cam slots. The washers 25 further serve to center the distal edges of the closure legs in position so that the units will not shift bodily in a lateral direction.

When it is desired to remove the closure assembly from its installed or operative position on the aircraft propeller, it is merely necessary for the pilot or other aircraft personnel to grasp the medial region of the cord 52 and pull or yank the cord in such a direction that the two closure units 40 will be forcibly slid from their operative positions on the counterweight casings 20. In the event that through inadvertence the aircraft is operated without first removing the closure assembly from its installed position, the first few revolutions of the propeller will effect forcible ejection of the assembly under the influence of centrifugal force. If the assembly is thrown clear of the aircraft, it may be retrieved for use again. However, if it should become entangled in the propeller, it may become damaged, but the low cost of the assembly renders the same expendible. In such an event, there is no possibility of damage to the propeller or its operating mechanism, or to any portion of the propeller mounting inasmuch as the units 40 are formed of light gauge material which is easily deformed.

The invention is not to be limited or restricted to the exact arrangement of parts shown in the accompanying drawing or described in this specification as various changes in the details of construction may be resorted to without departing from the spirit or scope of the invention. For example, while the illustrated form of closure assembly has been designed for use with a variable pitch propeller having two aligned propeller blades, it is within the purview of the invention to accommodate a propeller having three or more propeller blades and respective counterweight casings. In such an instance, additional closure units 40 will be provided and addition nylon or other cord material furnished to accommodate such units. Therefore, only insofar as the intentional nylon or other cord material furnished to accompanying claims is the same to be limited.

Having thus described the invention what I claim as new and desire to secure by Letters Patent is:

1. The combination with a generally cylindrical counterweight casing associated with a variable pitch aircraft propeller blade, said casing including a circular front wall, a circular rear wall and an interconnecting continuous cylindrical wall, the rear wall being formed with a cam slot therein, a guide pin projecting through said guide slot and normally occupying a position adjacent to one end of the slot, of a closure unit removably disposed on said counterweight casing and comprising a generally U-shaped clip formed of flat spring stock and including a flat closure leg the over-all dimensions of which are in excess of the over-all dimensions of the slot, a reaction leg and an interconnecting bight portion, said clip straddling the casing with the closure leg effectively fitting flush against said circular rear wall and covering the exposed portion of the cam slot, the reaction leg bearing against the front wall with an appreciable degree of pressure, and the bight portion overlying the cylindrical wall, the distal end of the closure leg bearing against said guide pin.

2. The combination set forth in claim 1 and wherein the distal end of the closure leg is formed with a recess conformable in shape to the contour of that portion of the guide pin against which it bears.

3. The combination set forth in claim 2 and including, additionally, a resilient liner interposed between the reaction leg and the front wall of the counterweight casing and substantially coextensive with the portion of the reaction leg which opposes the front wall.

4. The combination with an aircraft propeller mounting including a propeller blade barrel having radial arms each of which serves rotatably to support a propeller blade, a lever arm mounted on each propeller blade and projecting forwardly and outwardly of the barrel, a generally cylindrical cup-shaped counterweight casing carried at the outer end of each lever arm and including a circular front wall and a marginal cylindrical wall, the outer end region of the lever arm constituting a rear wall for the casing, the rear wall of the casing having formed therein a cam slot through which there projects a guide pin, of a closure assembly for covering the cam slots in the cylindrical walls of the counterweight casings, said assembly comprising a plurality of identical closure units, each unit being in the form of a U-shaped spring clip formed of flat spring stock and including a closure leg, a reaction leg and an interconnecting bight portion, the distal edge of the closure leg being formed with a clearance recess therein, each of said closure units being removably received over one of the counterweight casings in straddling relationship with the closure leg in effective face-to-face engagement with the circular rear wall of the associated casing and covering the slot therein, with the associated guide pin fitting within the clearance recess, with the reaction leg bearing against the front wall of the associated casing, and with the bight portion overlying the cylindrical wall of said associated casing, and a flexible combined tie and draw cord having ends secured to the bight portions of the spring clips.

5. The combination set forth in claim 4 and including, additionally, a resilient liner interposed between the reaction leg of each spring clip and the opposed portion of the front wall of the associated counterweight casing.

6. The combination set forth in claim 5 and including, additionally, an attention-attracting streamer secured to a medial region of the cord.

References Cited in the file of this patent

Hamilton Standard Propellers Service Manual No. 110D (pages 47 and 109–111) (published March 19, 1945).